April 14, 1970　　　O. A. WURTENBERG　　　3,505,795
PLEATED GAS FILTER
Filed April 26, 1968　　　　　　　　　　　　3 Sheets-Sheet 1
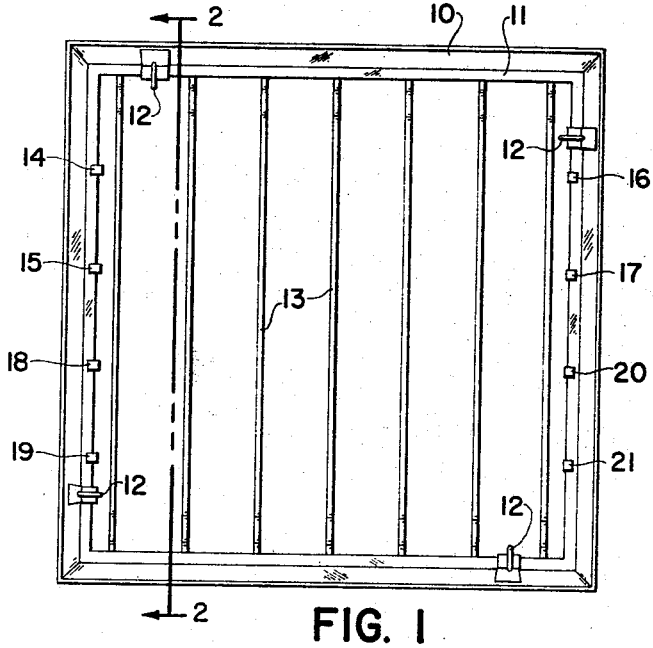
FIG. 1
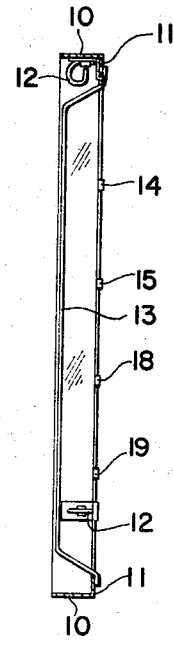
FIG. 2
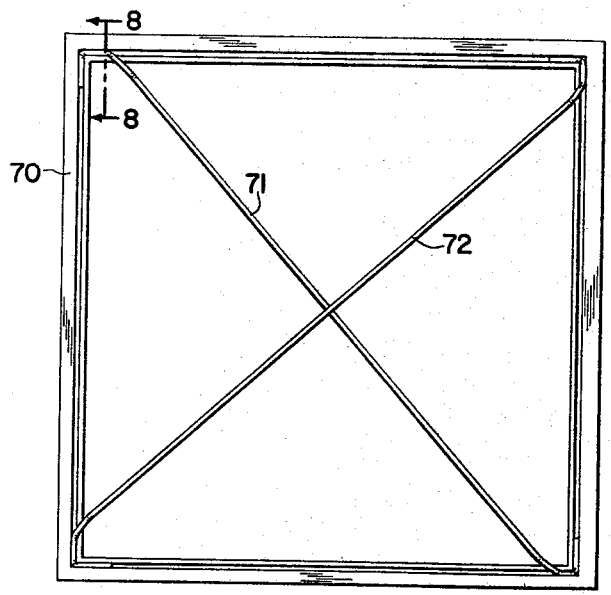
FIG. 7
FIG. 8
INVENTOR
OSCAR A. WURTENBERG
BY W. E. Sherwood
ATTORNEY INVENTOR
OSCAR A. WURTENBERG
BY W.E. Sherwood
ATTORNEY April 14, 1970          O. A. WURTENBERG          3,505,795

PLEATED GAS FILTER

Filed April 26, 1968          3 Sheets-Sheet 3

INVENTOR
OSCAR A. WURTENBERG

BY W. E. Sherwood
ATTORNEY

United States Patent Office 3,505,795
Patented Apr. 14, 1970

3,505,795
PLEATED GAS FILTER
Oscar A. Wurtenberg, Louisville, Ky., assignor, by mesne assignments, to Wehr Corporation, Milwaukee, Wis., a corporation of Wisconsin
Filed Apr. 26, 1968, Ser. No. 724,555
Int. Cl. B01d 39/08
U.S. Cl. 55—499                                      6 Claims

ABSTRACT OF THE DISCLOSURE

A gas filter structure in which an expendible pleated filter element is detachably secured and with the effective filtering surface of the element being enlarged by incorporating shallow end pockets therein as the filter is assembled. The confining structure for the filter element effects the shaping of the filter pockets during passage of gas through the filter and is demountable for storage or shipment purposes.

BACKGROUND OF THE INVENTION

This invention relates to an improved high-efficiency low-resistance type of filter for removing dust and other particulate matter from gas streams, and to a filter structure in which an expendible pleated filter element is employed.

In filters of this general nature, as exemplified by the patent to Bauder et al. No. 3,273,321, the filter element is draped over a supporting framework which in turn is attached to a filter frame adapted to be positioned in a duct through which the gas to be filtered moves under a suitable pressure. This gas serves to distend the filter element, and if portions of the end pleats or pockets should touch the duct walls or portions of adjacent pockets touch each other, the effective filtering action of the filter element is diminished. Moreover, it is desirable to employ as much filtering surface on a given filter element as possible and thus the arrangement of mounting the pleated filter element on the framework becomes important. As contrasted with a structure as shown by the Bauder et al. patent, for example, the present invention provides an improved filter having a greater filtering surface for a given size of filter frame and having a greater number of subdivided pocket-like portions in the filter element and with a reduced billowing effect of those portions while being subjected to the gas pressure.

In accordance with this invention a rectangular filter mounting frame has a flange at its downstream edge to which a filter-medium-shaping framework is secured and to which frame separate parallel pleat-supporting wires also are secured upstream from the framework. The framework includes a plurality of pairs of filter-medium-shaping loops so disposed that when a pleated sheet of filter medium, herein called the filter element, is draped over the parallel wires, these loops will serve to shape the filter medium downstream from the parallel wires into a series of generally tubular pockets. The filter element is pleated with relatively deep central pockets having their downstream folds adjacent the downstream end of the framework and with facing plies of filter medium at the lateral end edges of the central pockets being joined by seams. Significantly, the invention employs a filter element large enough to provide a pair of relatively shallow end pockets when the filter element is mounted and with the end edges of such shallow pockets being unjoined to each other other and with the downstream folds of the shallow pockets being located adjacent the flange of the filter frame. The filter element includes a perimetrical flange of filter medium surrounding all of the pockets and detachably clamped in place upon the upstream face of the flange.

Objects of the invention include the provision of a gas filter having an expendible pleated filter element with relatively deep central pockets and relatively shallow end pockets and with the downstream folds of the shallow pockets being located upstream from the downstream folds of the central pockets; a filter structure having a filter medium shaping framework with shaping loops against which a pleated filter element is pressed by gas pressure to define a plurality of tubular filtering pockets for each central pleated pocket of the filter element; a filter-medium-shaping framework which is readily assembled on or disassembled from the filter mounting frame and which framework is capable of nesting with other such frameworks for storage and shipment purposes; and a filter-medium-shaping framework supported on a filter mounting frame and having cantilever mounted shaping loops which are free to shift position with respect to separate pleat-supporting wires independently supported on the same filter mounting frame.

BRIEF DESCRIPTION OF THE DRAWINGS

The objects of the invention will become more apparent as the description proceeds and when considered in conjunction with the accompanying drawings in which:

FIG. 1 is a plan view of the filter mounting frame as seen from the upstream face thereof and with the filter disassembled.

FIG. 2 is a sectional view on line 2—2 of FIG. 1.

FIG. 7 is a plan view of the clamp for securing the filter element to the filter mounting frame.

FIG. 8 is a sectional view to a larger scale taken on line 8—8 of FIG. 7.

DESCRIPTION OF THE PREFERRED EMBODIMENT

Figure 3:
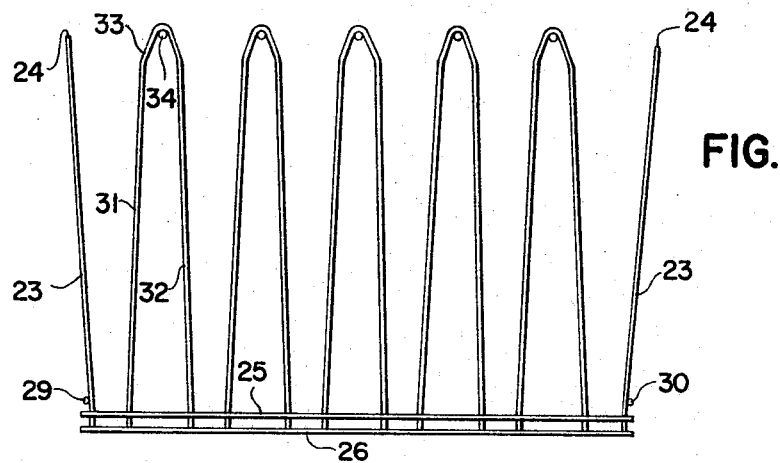
FIG. 3 is a side elevation view of the filter-medium-shaping framework detached from the remainder of the filter.
Figure 4:
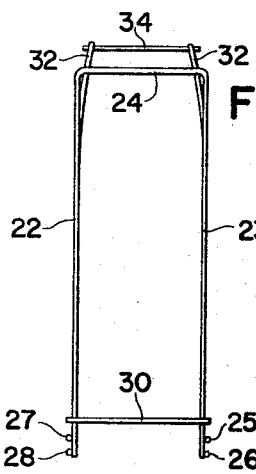
FIG. 4 is an end view of the framework.

Referring first to FIGS. 1 and 2 a rectangular filter mounting frame having a side wall 10 and an inwardly extending flange 11 at the downstream edge of that side wall is provided for mounting of the filter in a duct or at any other suitable location. Interiorly of the side wall and at spaced locations therearound a plurality of retainers 12 are pivotally mounted for engaging a detachable clamping member 70, later to be described. A plurality of generally parallel pleat-supporting members such as wires 13 are attached at their ends to the flange 11 and extend transversely of the frame with their central portions being offset upstream from that flange. Attached to the downstream face of flange 11 are corresponding pairs of spring clamps 14, 15; 16, 17; 18, 19 and 20, 21, located at opposite sides of the frame and so spaced that when the filter-medium-shaping frameworks, now to be described, are detachably secured by these clamps the filter element will be efficiently shaped thereby while air is passing the filter.

As seen in FIGS. 3 to 6, each of the frameworks, which are identical, comprise U-shaped end loops preferably formed of metallic wires having legs 22, 23 and an upstream connecting portion 24 and with the lower ends of the legs being attached to corresponding pairs of rigid rods 25, 26 and 27, 28 which form bridging side portions of the framework. Short rods 29, 30 are attached to the legs of the end loops adjacent those bridging side portions and having a length substantially the same as the upstream portion 24 of the end loops and form bridging end portions for the framework. The rectangular arrangement of the bridging side and end portions in conjunction with the legs of the loops thus defines a rigid base portion of the framework. Preferably the end loops are inclined as best seen in FIG. 3 so that the upstream portions 24 are outboard of the ends of the bridging side portions of the framework.

Figure 5:
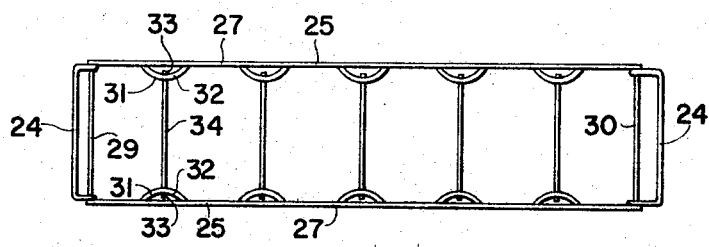
FIG. 5 is a plan view of the framework from its upstream side.

A plurality of identical generally V-shaped loops, here shown as five pairs, are equally spaced along the respective pairs of rods 25, 26 and 27, 28. Each of these loops comprise legs 31, 32 which are affixed to those rods, and with an arcuate nose portion 33 connecting the legs at the upstream end of the loops. As best seen in FIGS. 3 and 5, the noses of corresponding loops are attached by spacers 34 which are located in the inner curvature of the noses so that such spacers will not abrade the filter medium. Moreover, as seen in FIG. 5, the spacers 34 are somewhat shorter than the distance between the bridging side portions of the framework thus inclining the upper portions of the legs of the corresponding pairs of shaping loops toward each other, and in addition the legs of each shaping loop incline toward each other in the upstream direction to provide a generally U-shaped configuration with the apex thereof facing in said upstream direction. These features contribute not only to proper shaping of the filter medium but also permit nesting of frameworks for shipment or storage purposes.

Figure 6:
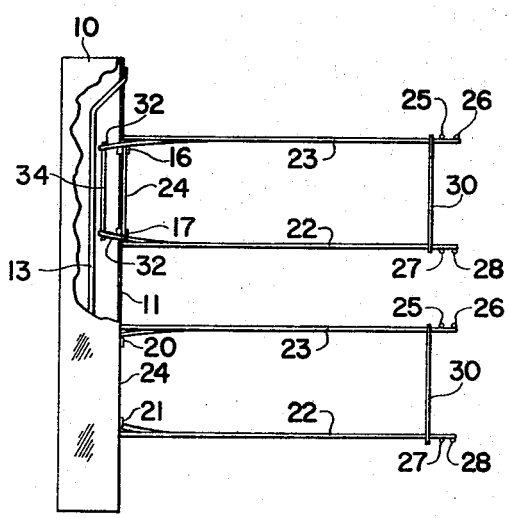
FIG. 6 is a side elevation of the filter frame with parts broken away, and with the framework attached, but with the filter element removed.
Figure 9:
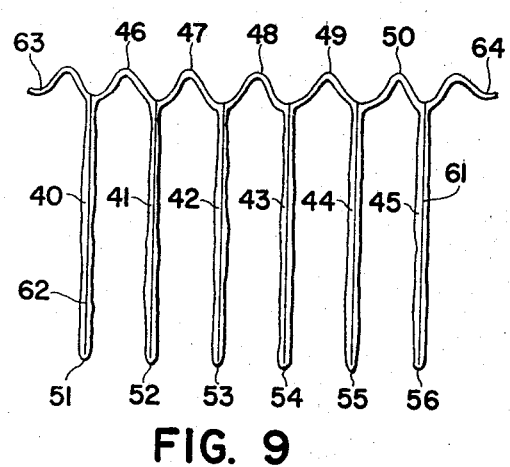
FIG. 9 is an end elevation view of the filter element.
Figure 10:
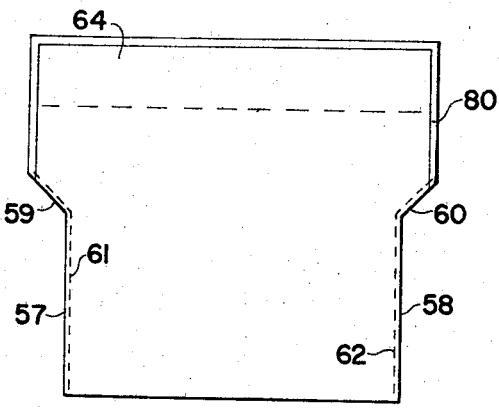
FIG. 10 is a side elevation view of the filter element with the endmost portions fully extended vertically.

Passing now to FIG. 6, when assembly of the confining structure for the filter element occurs all that is required is to engage the respective upstream connecting portions 24 of the end loops of the framework under the appropriate spring clamps and the structure is then ready for reception of the expendible filter element. That filter element preferably comprises a suitable filter medium, such as a fluffy sheet of plastic or glass fibers suitably matted together as a non-woven material, and preformed for ready insertion into the above-described confining structure. As shown in FIGS. 9 and 10, the filter element includes a series of interior pockets 40 to 45 in pleated form with upstream folds 46 to 50, and downstream folds 51 to 56, it being understood that the invention is not limited to having six of such pockets. In forming the filter element from the sheet of filter medium, the sheet is suitably cut away at its sides to provide lateral end edges of the pockets offset inwardly from the sides of the sheet as indicated at 57, 58 in FIG. 10 and with the upper portion of these pocket lateral end edges slanting toward the sides of the sheet as indicated at 59, 60. Sewn seams or other fastening means 61, 62 serve to close the lateral ends of the central pockets by joining the facing plies of filter medium of each such pocket to each other. The length of the sheet is such as to provide substantial terminal panels 63, 64 of full sheet width. When, therefore, the filter element is later installed on the mounting frame the periphery of these terminal panels merge into the upper side edges of the pleated sheet above the upper ends of the seams 61, 62 to form a perimetrical flange of filter medium surrounding all pockets in the filter element.

After the filter element is thus shaped for provision of the perimetrical flange, a narrow flexible tape 80 having a color contrasting with the color of the filter medium is sewn around the exposed edge of the filter medium for a purpose later to appear.

During such installation, a rectangular clamping plate 70, as shown in FIGS. 7 and 8, is positioned within the side wall 10 of the mounting frame and the perimetrical flange of the filter element is suitably crumpled upon itself between that clamping plate and the flange 11 so as to effect a sealing of the filter element against the mounting frame. The clamping plate is secured in place by turning the several retainers 12 into position as seen in FIG. 2 and in which position they resiliently press upon the upstream face of plate 70. For ease in installing and for reinforcement, the plate 70 is provided with a pair of diagonal wires, 71, 72 having their ends crimped in place in recesses at the respective corners of the clamping plate as best sen in FIGS. 7 and 8.

Figure 11:
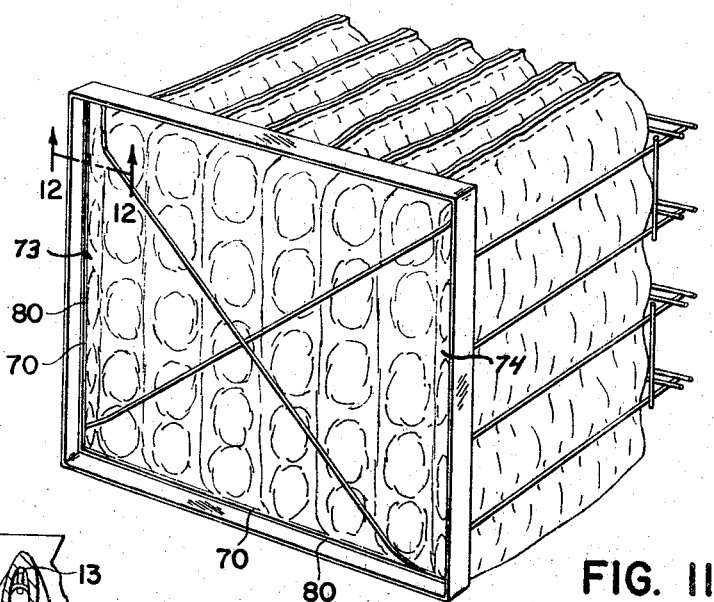
FIG. 11 is a perspective view of the assembled filter indicating diagrammatically the pocket formation when the filter element is distended under gas pressure.
Figure 12:
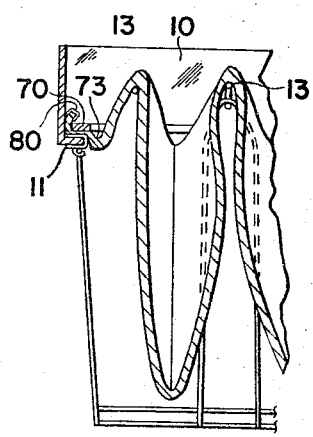
FIG. 12 is a sectional view to a larger scale showing the shallow end pocket, as taken on line 12—12 of FIG. 11.

In carrying out the assembly of the filter, the described filter element is draped upon the pleat supporting wires 13 (FIG. 6) and the side flanks of the pleated pockets rest against the legs of the shaping loops of the attached framework, which significantly is free to shift position with respect to those supporting wires 13. The terminal panels of the sheet of filter element are shaped manually into shallow lateral end pockets 73, 74 and the end edges of those end pockets which, unlike the central deeper pockets, are not joined by a seam, are crumpled under the clamping plate 70, leaving the edge of the tape 80 exposed as seen in FIG. 11. Thus when the user can see a continuous strip of the tape exposed around the entire periphery of clamping plate 70 he is assured that a proper sealing action will be effected during use of the filter. The tape 80, moreover, provides reinforcement to the filter element.

When the thus assembled filter is subjected to pressure of gas during filtering, well defined rows of pockets (as seen in FIG. 11) are formed as the filter element is pressed against the pleat-supporting wires and is confined in its lateral distention downstream of those wires by the pressure of the shaping loops on the two frameworks which are mounted as seen in FIG. 6. Since the loops of the frameworks preferably comprise metallic wires of about ⅛ inch diameter mounted in cantilever fashion upon the bridging structure of the framework and with arcuate nose portions 33, the filter medium adopts a formation resembling that of the separated pockets formed in prior filters wherein the sheet employs rows of pocket forming fasteners, as shown for example in Babbitt et al., Patent No. 3,217,472 and Wurtenberg Patent No. 3,261,148. Moreover, these shaping loops may adjust their positions under pressure of the gas so as to avoid any undue stretching of the filter medium.

The end pockets extending from the pleat supporting wire 13 to the ledge 11, when contrasted with a structure in which the end pockets extend from a downstream fold to the flange, add an appreciable amount of filtering surface to the filter even though such end pockets are comparatively shallow.

What is claimed is:

1. A gas filter adapted for mounting in a duct transversely of the direction of flow therein and comprising a rectangular filter mounting frame having an inwardly extending flange at its downstream edge, a plurality of parallel pleat-supporting members attached to said flange, a filter-medium-shaping framework secured to said mounting frame and extending downstream therefrom, said framework having a rectangular base portion, a plurality of pairs of elongated generally V-shaped, filter-medium-shaping loops each being attached at the ends of its legs to said base portion in spaced relation therealong, means joining the upstream directed noses of corresponding pairs of shaping loops, a U-shaped framework-mounting means at each end of said framework corresponding to the relative locations of said pleat-supporting members and having its downstream ends attached to said base portion and with its upstream end portion attached to said flange, a filter element draped over said pleat-supporting members and including a folded sheet of filter medium with relatively deep central pockets and a pair of relatively shallow end pockets with the downstream folds of said shallow pockets being displaced upstream from the downstream folds of said central pockets, said filter element having a perimetrical flange of filter medium surrounding all of said pockets adjacent the upstream mouths of said pockets, the facing plies of filter medium at the lateral end edges of each of said central pockets being joined by seams and the corresponding lateral end edges of each of said end pockets being unjoined, and clamping means securing the perimetrical flange of said filter element in place upon the upstream face of the flange of said mounting frame.

2. A filter structure as defined in claim 1 wherein said shaping loops are longer than said framework-mounting means thereby to dispose the noses of said loops upstream of said flange.

3. A filter structure as defined in claim 1 wherein said pleat-supporting members have central portions offset upstream from said flange and wherein the noses of said shaping loops are disposed in spaced relation to said pleat-supporting members.

4. A filter structure as defined in claim 1 wherein the base portion of said framework comprises bridging side portions and bridging end portions, the two legs of a given shaping loop being attached to one of said bridging side portions and the two legs of the corresponding loop of the pair being attached to the other of said bridging side portions.

5. A filter structure as defined in claim 4 wherein at least two of said frameworks are employed and with said frameworks being spaced from each other at a distance substantially equal to the distance between the bridging side portions of the framework.

6. A filter structure as defined in claim 1 wherein said filter element has a flexible tape attached to said perimetrical flange thereof and adapted to extend around the exposed perimeter of said clamping means.

References Cited

UNITED STATES PATENTS

| | | | |
|---|---|---|---|
| 1,779,458 | 10/1930 | Annis | 55—341 |
| 2,074,294 | 3/1937 | Woodruff | 55—500 |
| 3,187,489 | 6/1965 | Bauder et al. | 55—499 |
| 3,217,472 | 11/1965 | Babbitt et al. | 55—341 |
| 3,261,148 | 7/1966 | Wurtenberg | 55—341 |
| 3,273,321 | 9/1966 | Bauder et al. | 55—341 |
| 3,327,458 | 6/1967 | Auckland | 55—341 |
| 3,385,039 | 5/1968 | Burke et al. | 55—501 |
| 3,394,534 | 7/1968 | Andrews et al. | 55—484 |

FOREIGN PATENTS

| | | |
|---|---|---|
| 1,358,867 | 3/1964 | France. |
| 905,113 | 9/1962 | Great Britain. |
| 975,974 | 11/1964 | Great Britain. |

HARRY B. THORNTON, Primary Examiner

B. NOZICK, Assistant Examiner

U.S. Cl. X.R.

55—500, 521, 527